April 10, 1934.   J. G. OLIVER   1,954,057
APPARATUS FOR GROOVING LAMINATED GLASS
Filed May 9, 1933    2 Sheets-Sheet 1
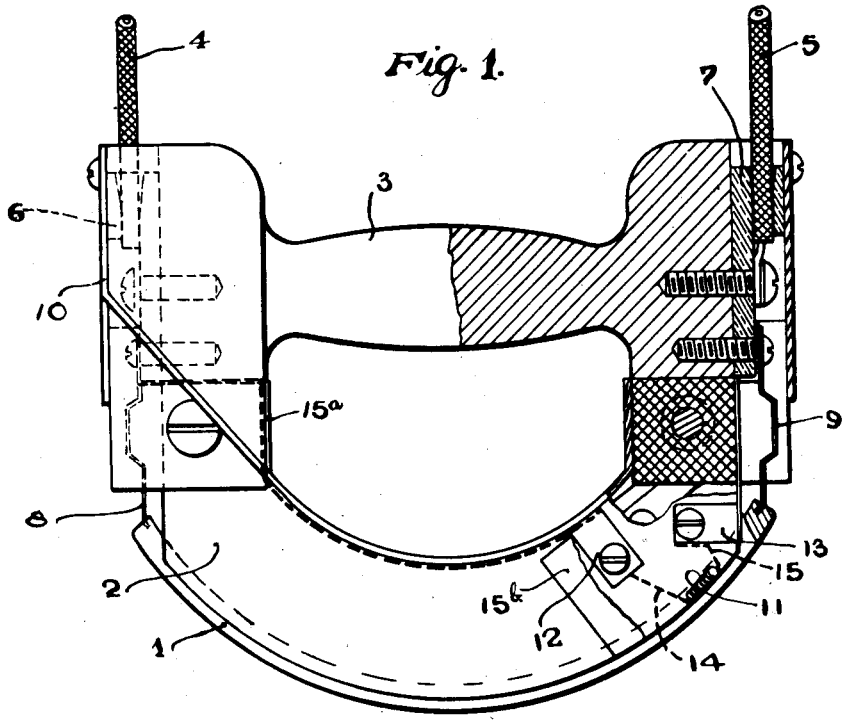
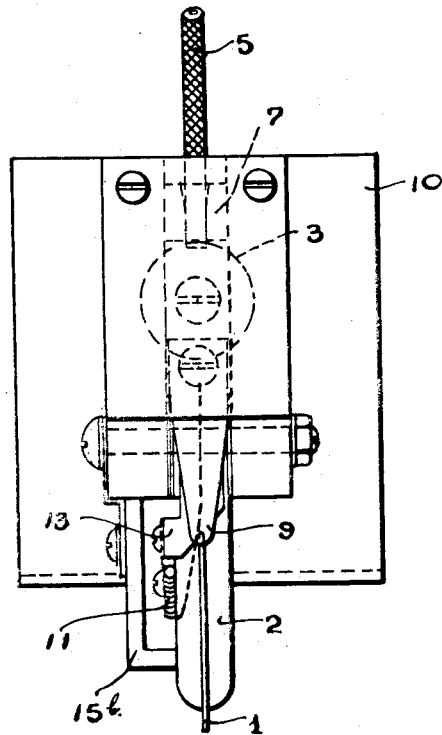
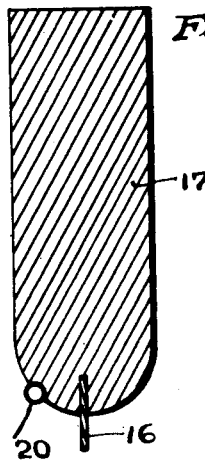
INVENTOR
JAMES G. OLIVER
BY Bradley & Dee
ATTORNEYS April 10, 1934.　　　　J. G. OLIVER　　　1,954,057
APPARATUS FOR GROOVING LAMINATED GLASS
Filed May 9, 1933　　　2 Sheets-Sheet 2
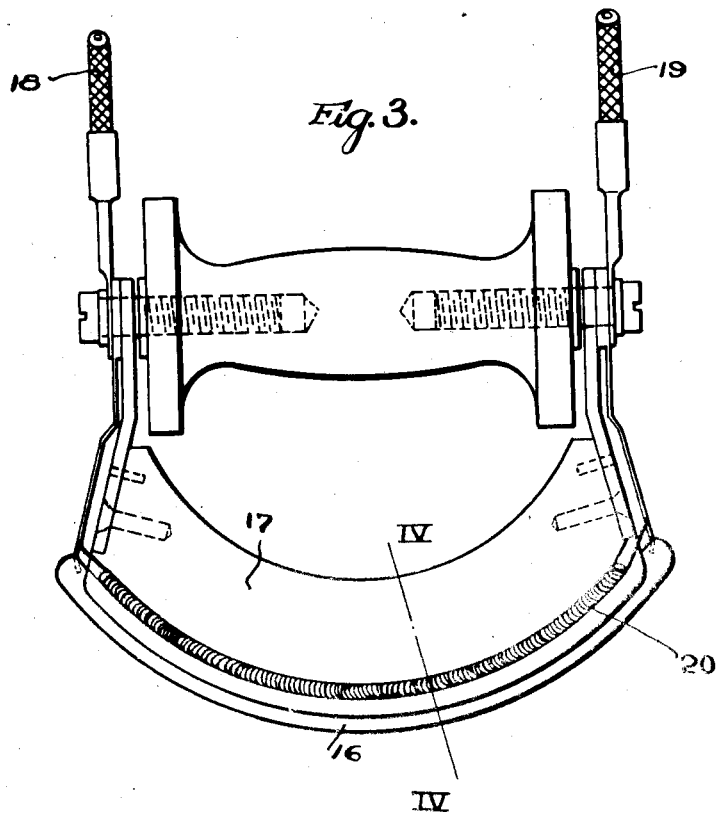
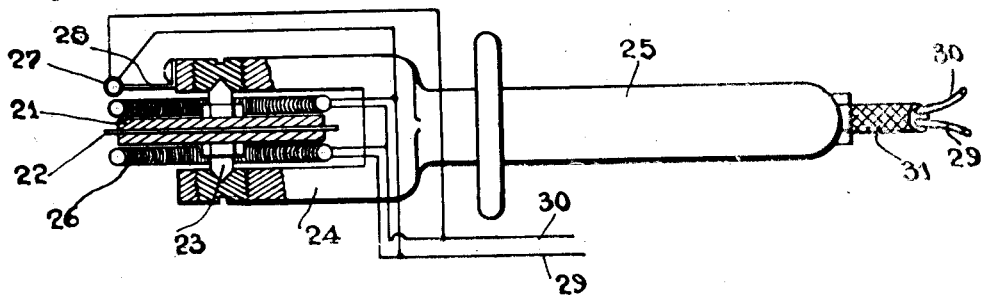
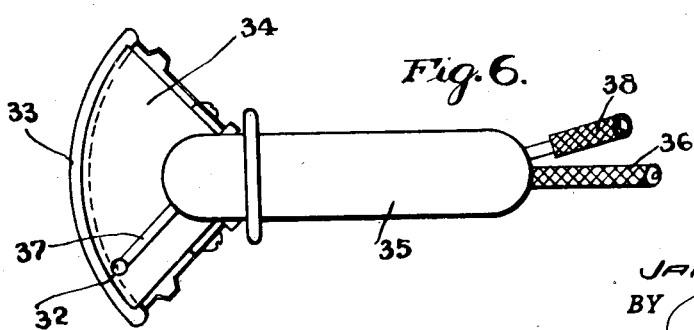
INVENTOR
JAMES G. OLIVER.
BY
ATTORNEYS Patented Apr. 10, 1934

1,954,057

UNITED STATES PATENT OFFICE 1,954,057

APPARATUS FOR GROOVING LAMINATED GLASS

James G. Oliver, Rosslyn Farms, Pa., assignor to Pittsburgh Plate Glass Company, a corporation of Pennsylvania Application May 9, 1933, Serial No. 670,122

5 Claims. (Cl. 219—29)

The invention relates to apparatus for grooving the edges of laminated plates made up of glass and cellulose plastic preliminary to applying sealing material to the groove. The apparatus commonly used is a heated ribbon or a wheel whose edge is pressed against the edge of the plastic to burn it out. One of the objections to the use of this apparatus is the fact that the heated member liberates gases which are always disagreeable and often injurious to the operator. The present invention involves the use of an igniting means for the gases which will cause their combustion as they are formed. This igniting means is preferably in the form of a small resistance element, such as a wire which is heated by a current of electricity to a point where it will ignite the gases coming in contact therewith, but the invention contemplates the use of any suitable ignition for this purpose, such as a flame or a sparking means, such means being located in all cases in close proximity to the heated grooving element. Heretofore in the use of an electrically heated grooving strip or ribbon, it has been necessary to use a ribbon or strip with a temperature high enough to ignite the gases. This temperature is so high that the ribbon or strip is made soft and readily bent out of shape. Other difficulties with the very hot ribbon are that glass chips melt on the ribbon and interfere with the grooving operation, and the ribbon is liable to burn out at high temperatures. The present improvement avoids the requirement of a high temperature ribbon, as it may be used at a dull red heat, at which temperature it is not readily bent; does not attach glass chips to itself; does not burn out as quickly as the high temperature ribbon; does not cause as much trouble in the ribbon holder due to excessive heat; and does not, in the groove, burn the cellulose plastic to such a degree as to make it difficult to scrape from the groove. Certain embodiments of the invention are illustrated in the accompanying drawings, wherein:

Figure 1 is a side elevation partially in section of one form of the apparatus. Fig. 2 is an end elevation of the apparatus of Fig. 1. Fig. 3 is a side elevation showing a modification. Fig. 4 is a section on the line IV—IV of Fig. 3. Fig. 5 is a side elevation, partially in section of a modification with the electrical connections shown diagrammatically. And Fig. 6 is a side elevation of another modification.

Referring to Figs. 1 and 2, 1 is a grooving ribbon set edgewise in a holder 2 of insulating material carried upon a handle member 3. The ribbon is of suitable resistance material, such as nickel chromium. Current is supplied for heating the ribbon by means of the leads 4 and 5 connected to plates 6 and 7 secured to the ends of the handle. Connection is made between the plates 6 and 7 with the ends of the ribbons by means of the members 8 and 9 of spring material tensioned so as to hold the ribbon in its groove in the member 2. A guard 10 of insulating material protects the hand of the operator from the heat generated in using the apparatus.

The ignition element is in the form of a small coil of resistance wire 11 supported adjacent the right hand end of the ribbon. The ends of the wire are connected to a pair of terminals 12 and 13 by means of the connections 14 and 15, the terminal 14 having electrical connection with the plate 7, while the terminal 12 has connection with the plate 6 by means of the strip 15a of copper which lies just beneath the guard 10. In order to protect the ignition element 11, a guard 15b is provided.

In operation, current is supplied to the device to heat the ribbon 1 to a dull red color and such ribbon is applied to the plate to be grooved with a rocking movement so that the plastic is burned out as the ribbon is rocked progressively along the edge of the plate. The ignition element 11 is heated to a bright red color by the current and its temperature is sufficient to ignite the gases which are liberated by the action of the ribbon 1 upon the cellulose plastic. In the operation of the device, the gases liberated are burned as the ribbon 1 is worked along the groove.

In the construction of Fig. 3, the grooving ribbon 16 is carried in a support 17, as in the construction of Figs. 1 and 2, and current is supplied through suitable connections from the leads 18 and 19. In this construction, the ignition element 20 is in the form of a resistance coil which extends the length of the ribbon and is mounted in a groove at the side of the ribbon, as indicated in Fig. 4. The operation is the same as that described in connection with Figs. 1 and 2.

Fig. 5 illustrates a modification in which the grooving element is in the form of a wheel 21 carrying the grooving ribbon 22, such wheel being mounted for rotation upon an axle 23. The axle is journaled in a fork 24 carried by a handle 25. Mounted on each side of the wheel is a heater in the form of a resistance coil 26, the heat from these coils serving by radiation to heat the ribbon 22 to the necessary temperature for grooving. The ignition element in this case is in the form of a coil 27 mounted on a bracket 28 in proximity to the periphery of the wheel.

Current is supplied to the heating coils 26, 26 and to the ignition coil 27 from the leads 29 and 30, as indicated diagrammatically, these leads being carried in the form of a cable 31 through the handle 25. In grooving with this apparatus, the ribbon 22 is pressed into the cellulose plastic to be grooved out and the wheel is rolled along the edge of the plate. The element 27 causes the gases formed in the grooving operation to ignite and burn, as heretofore described in connection with the constructions of Figs. 1, 2 and 3.

Fig. 6 illustrates a further modification in which the ignition element is in the form of a gas burner 32. In this construction, 33 is the grooving ribbon and 34 is a holder carried by the handle 35. Current is supplied through the ribbon 33 from leads carried in the cable 36. The burner is supplied by a conduit 37 extending through the handle and connected at its outer end to a flexible tube 38. Fuel for the burner may be in the form of gas or a combustible liquid, such as alcohol or the like. A small flame is maintained at the burner 32 which ignites the gas freed by the action of the ribbon 33 upon the cellulose plastic.

What I claim is:

1. In combination in an edge groover for laminated glass plates employing a cellulose plastic reinforcing sheet, a holder, a thin, heated grooving element carried by the holder and adapted to be pressed into the edge of the plastic sheet, and an igniting element supported adjacent to the grooving element and adapted to ignite the combustible gases liberated by the action of the grooving element upon the plastic.

2. In combination in an edge groover for laminated glass plates employing a cellulose plastic reinforcing sheet, a holder, a grooving ribbon carried by the holder, means for heating the ribbon, an ignition resistance wire supported adjacent to the ribbon, and means for supplying a heating current through said wire to heat it to a point where it will ignite the combustible gases liberated by the action of the ribbon upon the plastic.

3. In combination in an edge groover for laminated glass plates employing a cellulose plastic reinforcing sheet, a holder, a grooving ribbon carried by the holder, means for supplying electric current through the ribbon to heat it, an ignition resistance wire supported adjacent to the ribbon, and means for supplying a heating current through said wire to heat it to a point where it will ignite the combustible gases liberated by the action of the ribbon upon the plastic.

4. In combination in an edge groover for laminated glass plates employing a cellulose plastic reinforcing sheet, a holder, a grooving ribbon carried by the holder, means for heating the ribbon, an ignition resistance wire supported adjacent to one end of the ribbon, and means for supplying a heating current through said wire to heat it to a point where it will ignite the combustible gases liberated by the action of the ribbon upon the plastic.

5. In combination in an edge groover for laminated glass plates employing a cellulose plastic reinforcing sheet, a holder, a grooving wheel having a thin metal periphery, a resistance coil in parallel with such metal periphery, means for supplying a heating current through said coil, an ignition resistance wire supported adjacent the periphery of the wheel, and means for supplying a heating current through said wire to heat it to a point where it will ignite the combustible gases liberated by the action of the wheel upon the plastic.

JAMES G. OLIVER.